US00RE44480E

(19) United States
(12) Reissued Patent
Elmer

(10) Patent Number: US RE44,480 E
(45) Date of Reissued Patent: Sep. 10, 2013

(54) VEHICLE ADVERTISING SIGN, SYSTEM AND METHOD

(76) Inventor: William A. Elmer, Winter Park, FL (US)

(21) Appl. No.: 10/098,648

(22) Filed: Mar. 15, 2002

Related U.S. Patent Documents

Reissue of:
(64) Patent No.: 5,711,100
Issued: Jan. 27, 1998
Appl. No.: 08/074,598
Filed: Jun. 14, 1993

(51) Int. Cl.
*G09F 21/04* (2006.01)

(52) U.S. Cl.
USPC ..... 40/592; 40/600; 248/206.5

(58) Field of Classification Search
USPC ..... 40/542, 591, 600, 621; 224/309, 224/317, 321; 248/206.5, 634
See application file for complete search history.

(56) References Cited

U.S. PATENT DOCUMENTS

| | | | | |
|---|---|---|---|---|
| 823,459 | A | 6/1906 | Batchelder | |
| 914,775 | A | 3/1909 | Aarons | |
| 1,151,219 | A | 8/1915 | Scherer | |
| 1,359,492 | A | 11/1920 | Demuth | |
| 1,443,945 | A | 2/1923 | Cappell | |
| 1,463,326 | A | 7/1923 | Kristofek | |
| 1,700,383 | A | 1/1929 | Smigielski | |
| 2,077,585 | A | 4/1937 | Rivers | |
| 2,559,163 | A | 7/1951 | MacDonald | |
| 2,675,983 | A | 4/1954 | King | |
| 2,816,377 | A | 12/1957 | Hastings | |
| 2,825,799 | A | 3/1958 | Julien | |
| 2,875,324 | A * | 2/1959 | Camp et al. | 362/398 |
| 2,960,786 | A | 11/1960 | Wagner | |
| 3,153,294 | A | 10/1964 | Hay et al. | |
| 3,208,173 | A | 9/1965 | Shank | |
| 3,225,475 | A | 12/1965 | Shank | |
| 3,234,677 | A | 2/1966 | McDaniel et al. | |
| 3,239,957 | A | 3/1966 | Snediker | |
| 3,242,329 | A | 3/1966 | Abrams | |
| 3,245,165 | A | 4/1966 | Podoloff | |
| D205,209 | S | 7/1966 | Priddis | |
| 3,284,938 | A | 11/1966 | Diehl et al. | |
| 3,290,813 | A | 12/1966 | Rose, Sr. | |
| D207,240 | S | 3/1967 | Stevens et al. | |
| 3,440,748 | A | 4/1969 | Hackley | |
| 3,471,958 | A | 10/1969 | Westin | |

(Continued)

FOREIGN PATENT DOCUMENTS

| | | |
|---|---|---|
| AU | 2488832 | 1/1964 |
| CA | 2041396 | 10/1992 |
| EP | 415194 | * 3/1991 |
| GB | 2124008 | 2/1984 |

OTHER PUBLICATIONS

"Photograph of Auto Angle with magnets", Auto Sox USA, 1989.*

(Continued)

*Primary Examiner* — Gary C Hoge
(74) *Attorney, Agent, or Firm* — Allen, Dyer, Doppelt, Milbrath & Gilchrist, P.A.

(57) ABSTRACT

An advertising display for use above the roof of a vehicle comprises a rigid elongated and enclosed advertising member, which is of substantially triangular cross section and which can be reversibly mounted on a metallic roof with the use of magnets affixed within receptacles in the base of the display. Apparatus is provided for storing a plurality of the advertising members in a space-conserving fashion.

25 Claims, 3 Drawing Sheets

(56) References Cited

U.S. PATENT DOCUMENTS

| | | | |
|---|---|---|---|
| 3,507,245 | A | 4/1970 | Grabow |
| 3,633,299 | A | 1/1972 | Westin |
| 3,715,821 | A | 2/1973 | Hawes |
| 3,779,436 | A | 12/1973 | Burland |
| 3,828,455 | A | 8/1974 | Bentley |
| 3,828,456 | A | 8/1974 | Rose |
| 3,905,324 | A | 9/1975 | English |
| 3,916,816 | A | 11/1975 | Fitch |
| 3,936,967 | A | 2/1976 | Davis |
| 4,052,806 | A | 10/1977 | George |
| D246,937 | S | 1/1978 | Smith |
| 4,084,338 | A | 4/1978 | Ross |
| D255,726 | S | 7/1980 | Leuthesser |
| D256,419 | S | 8/1980 | Hom |
| 4,231,501 | A | 11/1980 | Goode |
| 4,292,627 | A | 9/1981 | Knight |
| D271,984 | S | 12/1983 | Nelson et al. |
| D277,298 | S | 1/1985 | Nelson |
| D277,299 | S | 1/1985 | Nelson |
| 4,587,754 | A | 5/1986 | Ossner |
| 4,667,428 | A | 5/1987 | Elmer ..... 40/592 |
| 4,671,004 | A | 6/1987 | Berg |
| 4,688,343 | A | 8/1987 | Allan |
| D312,097 | S | 11/1990 | Robinson |
| 4,976,410 | A | 12/1990 | Tomaiuolo |
| 4,995,186 | A | 2/1991 | Collie |
| 5,323,728 | A | 6/1994 | Hjelm |
| D368,934 | S | 4/1996 | Elmer |
| D386,091 | S | 11/1997 | Caulk |
| D386,208 | S | 11/1997 | Caulk |
| 5,711,100 | A | 1/1998 | Elmer |
| 5,918,397 | A | 7/1999 | Elmer |
| D418,930 | S | 1/2000 | DeLeon |

OTHER PUBLICATIONS

Pizza Today, Plastic Auto Angle, Nov. 1992, manufactured in 1991.*
"Magnetic Bases", The Magnetic Source, 1982.*
Photographs of sign from Mr. Bill's Sign Company (referenced in "Background of the Invention" section in parent patent 5,711,100 and 5,911,397).

* cited by examiner

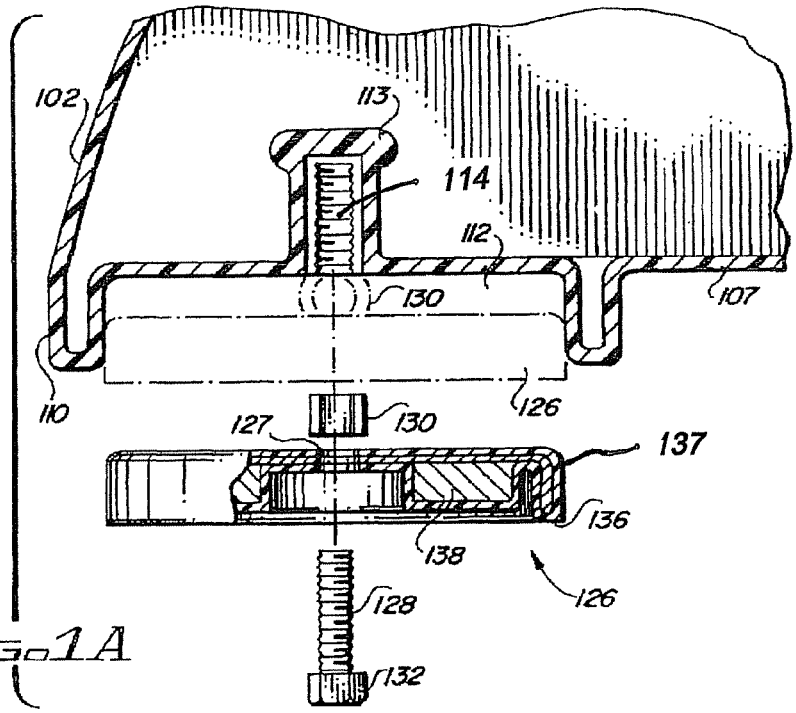
FIG. 1A
(Amended)

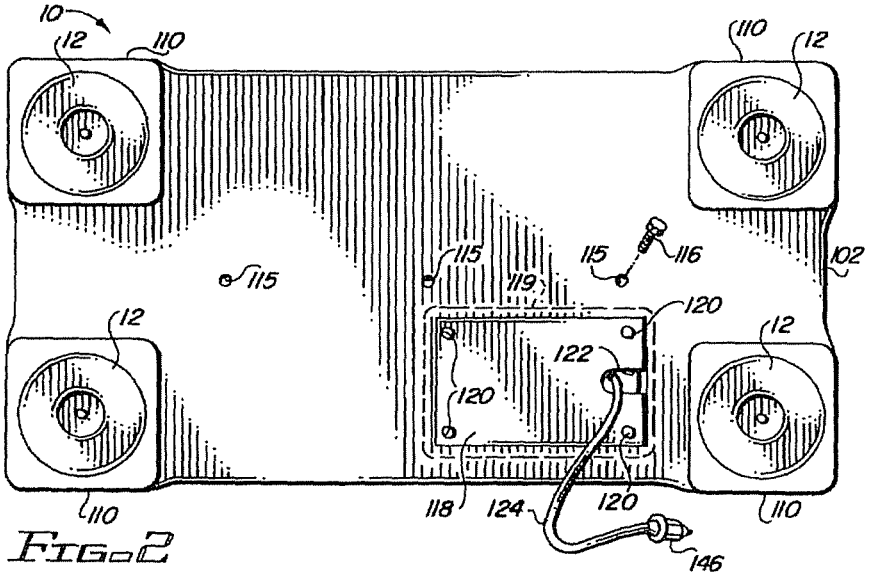
FIG. 2
FIG. 3
(Amended)
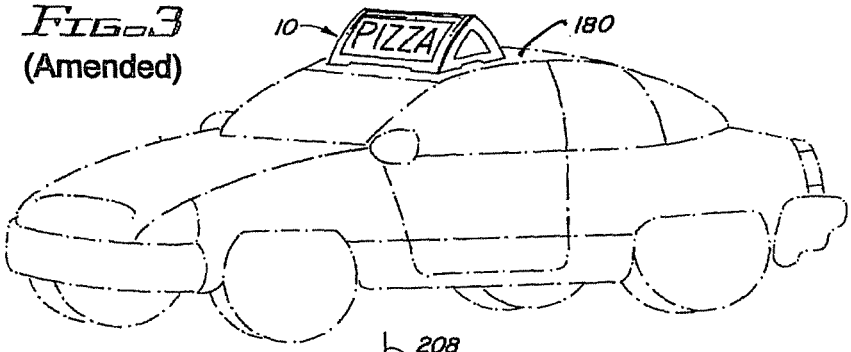
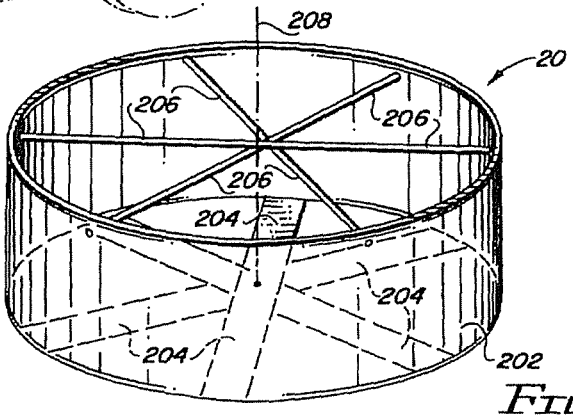
FIG. 4

VEHICLE ADVERTISING SIGN, SYSTEM AND METHOD

Matter enclosed in heavy brackets [ ] appears in the original patent but forms no part of this reissue specification; matter printed in italics indicates the additions made by reissue.

BACKGROUND OF THE INVENTION

The present invention relates to advertising signs and message boards which may be removably mounted upon a motor vehicle, and systems and methods for storing such signs.

A variety of businesses, particularly in the fast food industry, employ part-time delivery vehicles. Typically, the business will provide the part-time delivery person with a sign that may be easily mounted upon the delivery person's vehicle, but removed at the end of the delivery person's shift and used during the next shift. Examples of vehicle-mounted removable advertising signs are disclosed in my earlier U.S. Pat. Nos. 4,667,428, 4,839,975, 5,084,994, and D.290,620. Previous vehicle-mounted signs employing magnetic means of attachment have been disclosed in U.S. Pat. No. 3,440,748, issued to J. C. Hackley, and U.S. Pat. No. 2,960,786, issued to S. Wagner. A product of this type has also been sold commercially by Mr. Bill's Sign Co. of Leesburg, Fla. under the trademark "Drive-N-Ad".

SUMMARY OF THE INVENTION

The present invention concerns an apparatus and related method for displaying removable advertising sign on a vehicle. Magnetic means are provided for removably attaching the advertising sign to the vehicle, and includes illumination means for night-time visibility of the advertising message. Means are also provided for storing a plurality of the advertising members.

The advertising sign preferably comprises an enclosed, elongated hollow unitary member of molded translucent plastic, substantially triangular in cross section lateral to the elongated dimension, having opposing side surfaces which are bowed slightly outwardly to improve aerodynamics and with at least one side surface suitable for attaching advertisement thereto. The molded member includes a bottom having plural molded recesses each for receiving an individual magnet.

The magnetic means of attachment comprise plural magnets affixed to the base of the advertising member such that the advertising means will withstand forces occurring during the vehicle's motion without being dislodged. A special coating is disposed on each magnet to prevent scratching of the vehicle to which the magnets are attached.

The illumination means comprise at least one light positioned inside the advertising member, and with means for electrically coupling with an electrical source in the vehicle. The enclosed unitary construction of the molded advertising member prevents exposure of the illumination means to moisture during use.

Two forms of storage means are disclosed. In a first form, the storage means comprises a hollow member with means to support a plurality of the advertising members situated on end, and spacing means sufficiently thin so that an advertising member can fit between two contiguous spacing means. Both the spacing and support means are attached to the inner side of the hollow member at a position removed from the hollow member's edge. The shape of the hollow member is designed to surround a plurality of advertising members positioned on end in a space-efficient manner. The storage means are constructed in such a way that one holder may be completely or partially filled with advertising members and further stacked with another holder atop the stored advertising members. The additional holder can then be partially or completely filled with additional advertising members and these steps repeated, creating a space-efficient means for storing as many layers of holders and advertising members as can fit within the storage area.

In the second embodiment of the storage means, there is provided an elongated ferrous metal bar of sufficient length to accept a plurality of the advertising members, so that the magnetic means may be attached to the bar.

THE DRAWINGS

FIG. 1A represents a cross-sectional view of a portion of the advertising member and the magnetic means of attachment of the advertising member to a vehicle's roof, taken along the lines 1A-1A in FIG. 1.

FIG. 2 illustrates the bottom surface (base) of the advertising member of FIG. 1.

Figure 1:
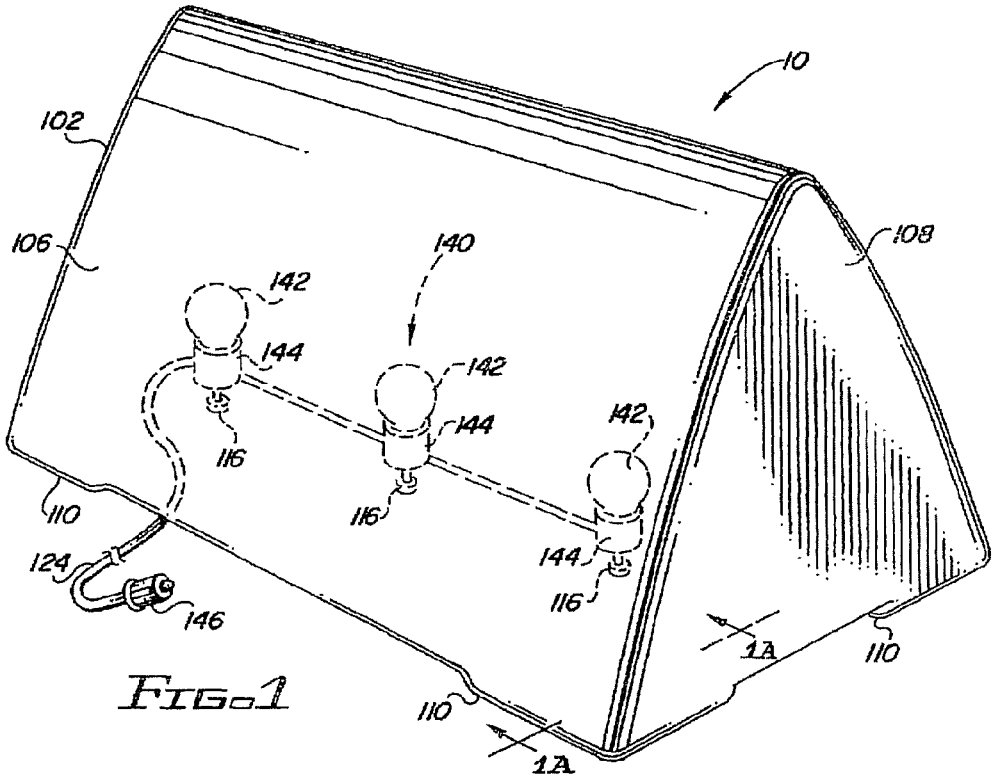
FIG. 1 is a perspective view of the advertising member.

FIG. 3 indicates a placement of the advertising member of FIG. 1 atop a vehicle.

FIG. 4 is a perspective view of a first embodiment of storage means for a plurality of the signs of FIG. 1.

Figure 5:
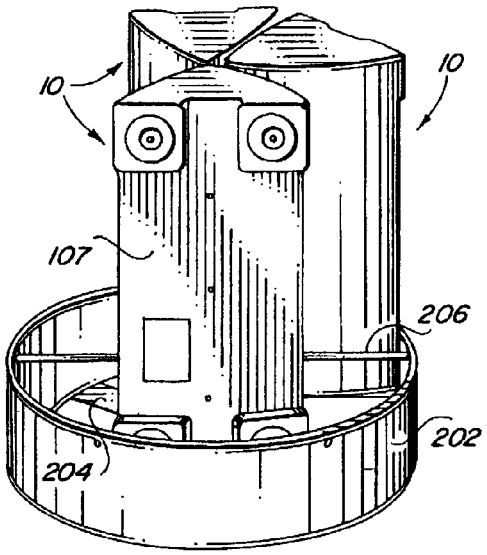

FIG. 5 is a perspective view of the holding apparatus with three advertising members placed therein.

Figure 6:
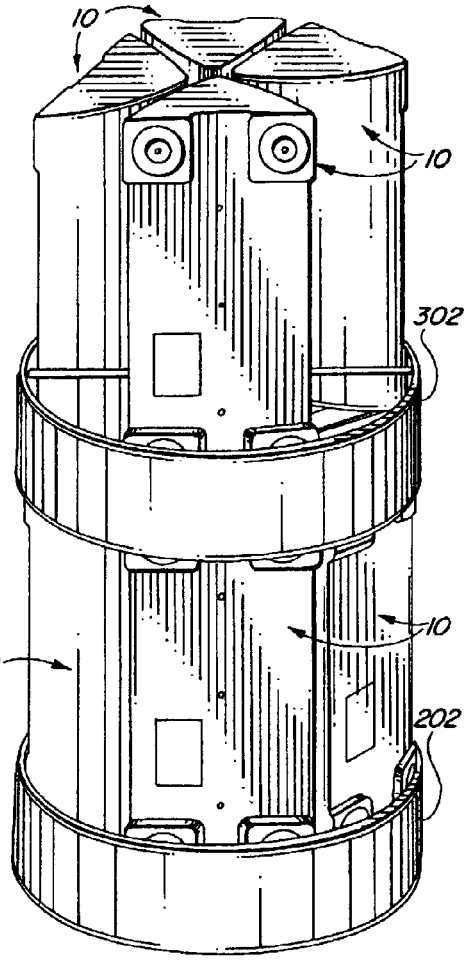

FIG. 6 is a perspective view of two of the holding apparatus of FIG. 5, the bottom one filled and with the top partially filled.

Figure 7:
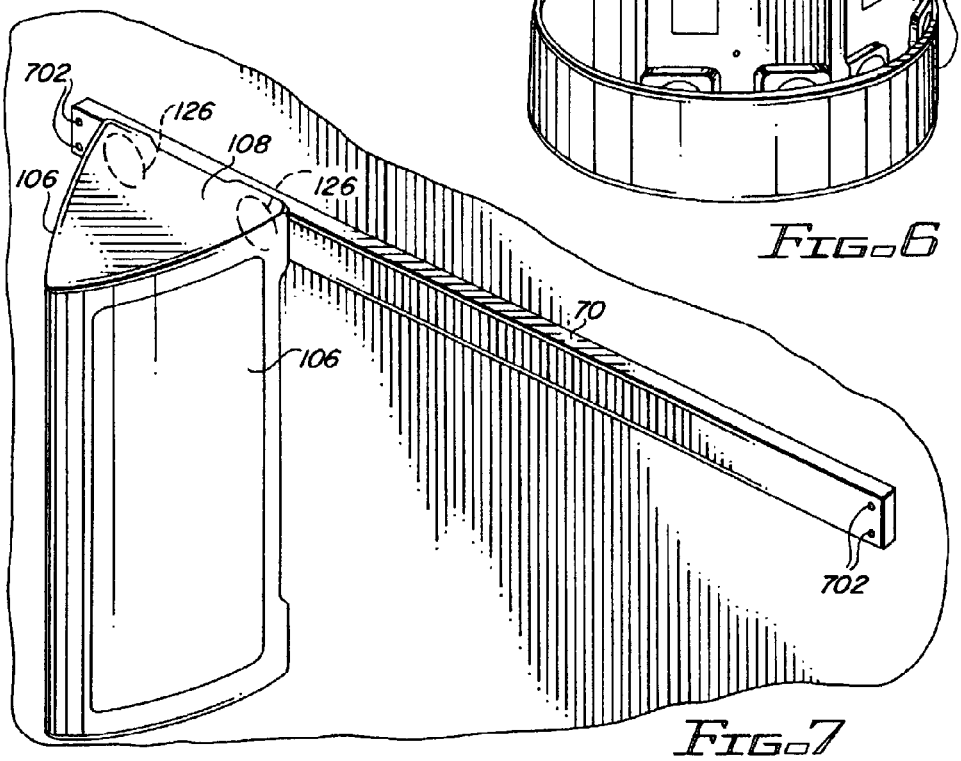

FIG. 7 is a front view of the second embodiment of storage apparatus.

DETAILED DESCRIPTION OF THE PREFERRED EMBODIMENT

The preferred embodiment of the present invention will now be described with reference to FIGS. 1-7, where the removable advertising sign of the present invention is referred to generally by the reference numeral 10.

FIGS. 1 and 2 show two views of advertising sign 10, comprising a hollow, rigid and translucent unitary molded plastic advertising member 102 of substantially triangular cross section lateral to the elongated direction. This unitary construction significantly reduces the intrusion of water, which is detrimental to the illumination system. Advertising member 102 possesses two triangular end faces 108, a base 107 *in the form of a generally rectangular sheet of plastic material*, and two elongated, substantially rectangular side surfaces 106 which are somewhat curved to improve aerodynamic characteristics, and to which side and end surfaces advertising messages may be affixed. The molded advertising member 102 also contains four integrally molded feet 110 *each of which extends below the plane of the remaining central portion of the base 107*, each *molded foot 110* at a corresponding corner of the base 107. All edges of the molded advertising member are closed and rounded to improve aerodynamic and moisture resistance properties.

FIG. 1A illustrates a coated magnet assembly 126 removably affixed within a similarly-shaped, indented recess *or receptacle* 112 in each foot 110 via screw 128, which possesses a beveled head 132 and is threaded into metal sleeve 114. The sleeve 114 is set into a molded extension 113 through the base 107 and into the internal cavity of the advertising member 102. A flexible sleeve 130 is interposed between each magnet *assembly* 126 and recess *or receptacle* 112; beveled head 132 and flexible sleeve 130 permit a non-rigid attachment of magnet assembly 126 in the corresponding recess 112, thus permitting the magnet assembly 126 to pivot slightly as needed to adjust for curvature in the vehicle's roof. Each magnet assembly 126 is coated with a scratch-resisting plastic material which is chosen to prevent both scratching of the vehicle's metallic surface and exposure of the metallic stand-off housing 134 (described below). A suitable scratch-resistant coating material is Plascoat PPA 571 manufactured by Plastronics, Inc. A screw hole 127 in the coated magnet assembly 126 is recessed so that the head of screw 128 will not contact the roof of the vehicle.

Magnet assembly 126 preferably comprises a coated metal housing 134 with lip 136, which extends slightly beyond a corresponding magnet 138 to permit easier removal of advertising member 102 from the vehicle roof; that is, to define a space between the coated face of the magnet 138 and the roof, so that the force of the magnet may more easily be decoupled from the metal of the roof. As noted by the dotted lines in FIG. 1A, the magnet assembly 126 extends slightly below the bottom level of the foot 110.

Base 107, shown in FIG. 2, contains holes 115 for three fasteners 116 for supporting the illuminating lamp assembly 140 shown by dotted lines in FIG. 1 and which is accessible through removable plate 118 (FIG. 2). This removable plate 118 is affixed into a recessed well 119 in base 107 by four fasteners 120, and also contains a notch 122 through which the electrical cord 124 for the lamp assembly 140 is extended.

Again noting FIG. 1, the illuminating lamp assembly 140 comprise a plurality of light bulbs 142 removably affixed in braces 144, which are attached to base 107 via fasteners 116. Electrical continuity is attained via electrical cord 124 coupled via plug 146, which is removably engaged into a conventional automobile lighter.

The advertising sign 10 is removably affixed to a metallic vehicle roof 180 in such a way that the advertising sign may be read from all directions, as shown in FIG. 3. This is accomplished by placing the long axis of advertising sign 10 on the roof 180 parallel to the windshield of the vehicle. In this configuration, the slight curvature of the forward-facing side 106 substantially reduces wind resistance, and thus, the likelihood that the sign 10 will be blown from the automobile at elevated speeds. *Each receptacle 112 is formed by the extension of the adjacent side 106 and the adjacent end 108 below the remaining central portion of the base 107 so as to surround the corresponding magnet assembly 126.* The dimension of the feet 110 insures that the curvature of the roof does not prevent the magnets from engaging the roof 180. Alternately, the sign 10 may be placed longitudinally along the roof 180.

Apparatus for holding the advertising signs 110 in accordance with the present invention is shown in FIGS. 4-6 and is referred to generally by the reference numeral 20. This first embodiment of a storage apparatus comprises a rigid cylinder 202, the diameter of which is slightly greater than the length of two sides 106 of sign 10. The cylinder 202 has three substantially coplanar flat support members 204 sufficiently wide to support in a stable manner an advertising sign extending diagonally across the cylinder 202, and three substantially coplanar spacing members 206 sufficiently thin to fit between two contiguously placed advertising signs extending across the cylinder 202 and spaced from the support members 204. The support and spacing members 204, 206 are substantially equally spaced radially and pass through the axis 208 of the cylinder 202 in a radially offset fashion so that an advertising sign 10 placed between two spacing members 206 rests on one support member 204. In this embodiment six advertising signs 10 with their bases 107 pointing outward will fit into one holding apparatus 20 (see FIG. 5).

A plurality of combinations of cylinders and signs 10 as described in the preceding paragraph may be stacked as shown in FIG. 6, whereby a first cylinder 202 is filled with advertising signs 10 and then another cylinder 302 is placed atop the advertising members 10 in the first cylinder 202. This second cylinder 302 may then also be filled with advertising members 10.

A second embodiment of storage apparatus in accordance with the present invention is shown in FIG. 7. In this arrangement, an elongated bar 70 of a ferrous metal is supported by fasteners 702 to a wall or similar vertical structure. The advertising members 10 are then stored along the bar by attaching one pair of magnet assemblies 126 to the bar 70. While a single advertising member 10 is shown attached to the bar 70 in FIG. 7, it will be appreciated that the bar 70 is dimensioned to accept a plurality of the advertising members 10 and that additional ferrous metal bars 70 may be also affixed to the same vertical support for storing additional advertising members.

It will be understood by those skilled in the art that the advertising member 10 of the present invention and its associated storing arrangements provide numerous advantages and improvement with respect to the prior art. For example, the unitary, enclosed construction of the sign member 10 and the curvature of the elongated signs 106 provide a large message area, while significantly reducing wind resistance relative to prior art sign structures of [a] similar configuration. The integral, enclosed nature of the base 107 also contributes to the reduction of wind drag, while protecting the illuminating lamp assembly of 140 from moisture. The corner feet 110 further contribute to a reduction in wind drag, being integrally molded with the remainder of the body, while insuring that the advertising member 10 is capable [of-being] *of being* supported upon the roof of vehicles having a wide range of curvature across the roof. The particular construction of the magnet assembly 126, and the particular manner in which it is supported in the corresponding one of the feet 110 permits the advertising member 10 to be easily attached to and removed from a roof of a vehicle, again while insuring that the member 10 remains firmly attached to the roof of the vehicle during use. The particular [selection] *section* of scratch-resistant coating [134] *137* on the magnet assembly 126 protects both the magnet assembly and the vehicle roof during use.

This concludes the description of the preferred embodiments. A reading by those skilled in the art will bring to mind various changes without departing from the spirit and scope of the invention. It is intended, however, that the invention only be limited by the following appended claims.

What is claimed is:

1. An advertising sign for removably mounting onto a metal panel of a motor vehicle, comprising:

an advertising member having a base, ends and sides formed together into a completely enclosed hollow body, the base including plural magnet receptacles with a magnet fastened in each receptacle;

each said magnet comprising a dish-shaped housing with a magnetic member within each housing, the housing having an edge extending below the magnetic member; and means for pivotally attaching each magnet to the base so that each magnet can pivot and adjust to differences in slope along a vehicle metal panel to which the advertising sign may be attached.

2. An advertising sign for removably mounting onto a metal panel of a motor vehicle, comprising:

an advertising member having a base, ends and sides formed together into a completely enclosed hollow body;

plural magnets; and means for pivotally attaching each magnet to the base so that each magnet can pivot and adjust to differences in slope along a vehicle metal panel to which the advertising sign may be attached, wherein the pivotal attaching means comprises a flexible sleeve between each magnet and the base, *and a fastener extending through each magnet, its flexible sleeve and into the base*.

[3. The advertising sign recited in claim 2 wherein the pivotal attaching means comprises a fastener extending through each magnet, its flexible sleeve and into the base.]

4. An advertising sign for removably mounting onto a metal panel of a motor vehicle, comprising:

an advertising member formed of a hollow, translucent and completely enclosed body having a base, ends and sides formed of a unitary molded plastic, the body including plural molded feet extending from and forming a part of the base at each corner thereof, and with an indented receptacle in each foot of the base, each receptacle shaped and dimensioned to receive a magnet assembly therein;

plural magnet assemblies, each magnet assembly including a [non-metallic] *non-magnetic*, dish-shaped housing with a magnet within the housing, the housing having an edge extending below the magnet; and means for fastening each magnet assembly within the receptacle of a corresponding foot of the base, the fastening means attaching each magnet within the receptacle so that a portion of the magnet extends below its receptacle.

5. The advertising [sigh] *sign* recited in claim 4 further comprising means for pivotally attaching each magnet assembly in the receptacle so that each magnet can pivotally adjust to differences in slope along a vehicle metal panel to which the advertising sign may be attached.

6. The advertising sign recited in claim 5 wherein the pivotally attaching means comprises:

a flexible sleeve between each magnetic assembly and the base; and a fastener extending through each magnet assembly, each flexible sleeve and into the base.

*7. The advertising sign recited in claim 1 wherein the magnet receptacles collectively surround all of the magnets.*

*8. The advertising sign recited in claim 7 wherein each magnet receptacle surrounds at least one of the magnets.*

*9. The advertising sign recited in claim 7 wherein the base includes a remaining portion apart from the receptacles, and wherein each magnet receptacle extends below the remaining portion.*

*10. The advertising sign recited in claim 9 wherein each magnet receptacle also extends below the remaining portion of the base and along a portion of an adjacent side.*

*11. The advertising sign recited in claim 10 wherein each magnet receptacle also extends below the remaining portion of the base along a portion of an adiacent end.*

*12. The advertising sign recited in claim 1 further comprising a plastic coating over the edge of each dish-shaped housing.*

*13. The advertising sign recited in claim 2 wherein the advertising member further comprises:*

*plural magnet receptacles, each extending below a remaining portion of the base around each receptacle.*

*14. The advertising sign recited in claim 13 wherein each magnet receptacle extends along a portion of an adjacent side.*

*15. The advertising sign recited in claim 14 wherein each magnet receptacle extends along a portion of an adjacent end.*

*16. The advertising sign recited in claim 15 wherein each magnet receptacle surrounds at least one of the magnets.*

*17. The advertising sign recited in claim 2 further comprising a plastic coating extending across a bottom surface of each magnet.*

*18. The advertising sign recited in claim 1 further comprising means for supporting the sign in a suspended storage position by removable attachment of at least one magnet fixed to the base to a separate metallic member.*

*19. The advertising sign recited in claim 2 wherein the base comprises a unitary and rectangular sheet of plastic material, with the plural magnets comprising at least four spaced magnets each of which is mounted at a corner of the base.*

*20. The advertising sign recited in claim 19 further comprising a fastener and flexible sleeve with each of the magnets, with all of the magnets pivotal about an outer extremity of the respective fastener.*

*21. The advertising sign recited in claim 20 wherein each fastener comprises a beveled head to facilitate pivoting of the respected magnet.*

*22. The advertising sign recited in claim 21 further comprising a lighting assembly mounted along an inner surface of the rectangular base, the ends and sides of the members being sufficiently translucent to permit light to emit therethrough.*

*23. The advertising sign recited in claim 22 wherein the lighting assembly extends lengthwise along the rectangular base.*

*24. The advertising sign recited in claim 2 further comprising:*

*the base formed of a unitary and rectangular sheet defining four spaced corners, with the plural magnets comprising at least four spaced magnets each of which is mounted at a corner of the base with each magnet having a respective fastener and a respective sleeve, with each fastener extending through the corresponding magnet and corresponding sleeve and the base so that each magnet is independently pivotal about an outer, beveled end of the associated fastener; and*

*wherein that portion of the base adjacent each magnet is recessed inwardly relative to the adjacent side and end of the sign.*

*25. The advertising sign recited in claim 24 wherein each magnet is dimensioned so that an upper side of each magnet is recessed toward the base relative to the portions of the adjacent side and adjacent end of the sign, and an opposing bottom magnet side extends below portions of the adjacent side and adjacent end.*

*26. An advertising sign for removably mounting onto a metal panel of a motor vehicle, comprising:*

*an advertising member having a base, ends and sides formed together into a completely enclosed hollow body, the base including plural magnet receptacles with a magnet fastened in each receptacle and with the base being generally rectangular and with each receptacle being located at a corner of the base;*

*each said magnet comprising a dish-shaped housing with a magnet member within each housing, the housing having an edge extending below the magnetic member and with each receptacle being at least partially defined by*

*extending portions of the end and the side of the base next adjacent each receptacle;*

*means for pivotally attaching each magnet to the base so that each magnet can pivot and adjust to differences in slope along a vehicle metal panel to which the advertising sign may be attached; and*

*plastic means across the bottom of each magnet member and forming the edge extending below the magnet member.*

* * * * *